United States Patent
Condessa

(10) Patent No.: US 11,657,153 B2
(45) Date of Patent: May 23, 2023

(54) SYSTEM AND METHOD FOR DETECTING AN ADVERSARIAL ATTACK

(71) Applicant: Robert Bosch GmbH, Stuttgart (DE)

(72) Inventor: Filipe Joao Cabrita Condessa, Pittsburth, PA (US)

(73) Assignee: Robert Bosch GmbH, Stuttgart (DE)

(*) Notice: Subject to any disclaimer, the term of this patent is extended or adjusted under 35 U.S.C. 154(b) by 664 days.

(21) Appl. No.: 16/715,643

(22) Filed: Dec. 16, 2019

(65) Prior Publication Data

US 2021/0182394 A1 Jun. 17, 2021

(51) Int. Cl.
*G06F 21/56* (2013.01)
*G06N 3/08* (2023.01)
(Continued)

(52) U.S. Cl.
CPC ............ *G06F 21/566* (2013.01); *G06N 3/044* (2023.01); *G06N 3/049* (2013.01); *G06N 3/08* (2013.01); *G06F 2221/034* (2013.01)

(58) Field of Classification Search
CPC .................. G06F 21/566; G06F 21/554; G06F 2221/034; G06N 3/0445; G06N 3/049; G06N 3/08; G06N 3/0454; G06N 20/00
See application file for complete search history.

(56) References Cited

U.S. PATENT DOCUMENTS 9,652,464 B2 * 5/2017 Ogawa ................ H04L 63/1425
10,275,955 B2 4/2019 Gupta et al.
(Continued)

OTHER PUBLICATIONS

Papernot et al., "Practical Black-Box Attacks Against Machine Learning," ASIA, CCS '17, Apr. 2-6, 2017, Abu Dhabi, United Arab Emirates, ACM ISBN 978-1-4503-4944-4/17/04, http://dx.doi.org/10.1145/3052973.3053009, arXiv:1602.02697v4 [cs.CR], 14 pages, Mar. 19, 2017.

(Continued)

*Primary Examiner* — Khoi V Le
(74) *Attorney, Agent, or Firm* — Kathy Taleguchi; Maginot, Moore & Beck LLP

(57) ABSTRACT

A computer-implemented method relates to training a machine learning system to detect an adversarial attack. The method includes classifying a first sequence as belonging to a first class indicative of a nominal sequence based on a first prediction that the first sequence includes an unperturbed version of sensor data. The method also includes classifying a second sequence as belonging to a second class indicative of an adversarial sequence based on a second prediction that the second sequence includes a perturbed version of the sensor data. Combined loss data is generated for a collection of sequences and is based on a first average loss with respect to incorrect classifications of the first class and a second average loss with respect to incorrect classifications of the second class. Parameters of the machine learning system are updated based on the combined loss data. Once trained, the machine learning system is operable to generate a first label to indicate that an input sequence is classified as belonging to the first class and generate a second label to indicate that the input sequence is classified as belonging to the second class, thereby enabling a control system to operate in a nominal manner based on the first class and a defensive manner based on the second class.

16 Claims, 6 Drawing Sheets

(51) Int. Cl.
*G06N 3/049* (2023.01)
*G06N 3/044* (2023.01)

(56) References Cited

U.S. PATENT DOCUMENTS

| | | | |
|---|---|---|---|
| 10,356,122 B2* | 7/2019 | Ruvio | G06N 20/00 |
| 2019/0042761 A1* | 2/2019 | Wang | G06N 5/043 |
| 2019/0080089 A1* | 3/2019 | Chen | G06N 20/10 |
| 2019/0238568 A1* | 8/2019 | Goswami | G06N 20/10 |
| 2020/0005133 A1* | 1/2020 | Zhang | G06N 3/0454 |
| 2020/0234110 A1* | 7/2020 | Singh | G06F 21/57 |
| 2021/0157912 A1* | 5/2021 | Kruthiveti Subrahmanyeswara Sai | G06N 20/00 |

OTHER PUBLICATIONS

Sheikholeslami et al., "Minimum Uncertainty Based Detection of Adversaries in Deep Neural Networks," arXiv:1904.02841v1 [cs.LG], 15 pages, Apr. 5, 2019.

Liang et al., "Detecting Adversarial Image Examples in Deep Neural Networks with Adaptive Noise Reduction," https://ieeexplore.ieee.or/document/8482346, arXiv:1705.08378v5 [cs.CR], 14 pages, Jan. 9, 2019.

Pang et al., "Towards Robust Detection of Adversarial Examples," 32nd Conference on Neural Information Processing Systems (NIPS 2018), Montreal, Canada, arXiv:1706.00633v4 [cs.LG], 20 pages, Nov. 7, 2018.

* cited by examiner

SYSTEM AND METHOD FOR DETECTING AN ADVERSARIAL ATTACK

FIELD

This disclosure relates generally to machine learning systems, and more particularly to detecting a sequence of adversarial data.

BACKGROUND

In general, machine learning systems, particularly deep neural networks, are susceptible to adversarial attacks. These adversarial attacks may include black box attacks, which relate to attacks based on knowledge of the expected output of the machine learning system, and/or white-box attacks, which relate to attacks based on knowledge of the internal workings of the machine learning system. As an example, a machine learning system may be attacked via its input. Such adversarial attacks find perturbations on the inputs that cause changes to the output data of the machine learning system. These adversarial attacks are typically performed by updating the perturbations on the input data based on feedback until the machine learning system makes determinations that are corrupted by these perturbations such that incorrect output data (e.g., misclassifications of input data) is generated, thereby resulting in negative consequences and effects.

SUMMARY

The following is a summary of certain embodiments described in detail below. The described aspects are presented merely to provide the reader with a brief summary of these certain embodiments and the description of these aspects is not intended to limit the scope of this disclosure. Indeed, this disclosure may encompass a variety of aspects that may not be explicitly set forth below.

According to at least one aspect, a computer-implemented method relates to training a machine learning system to detect an adversarial attack. The method includes obtaining a collection of sequences. The collection of sequences include at least a first sequence and a second sequence. The method includes classifying the first sequence as belonging to a first class indicative of a nominal sequence based on a first prediction that the first sequence includes an unperturbed version of sensor data. The method includes classifying the second sequence as belonging to a second class indicative of an adversarial sequence based on a second prediction that the second sequence includes a perturbed version of the sensor data. The method includes generating combined loss data based on (i) a first average loss involving incorrect classifications of the first class with respect to a first set of sequences from the collection of sequences in which each sequence within the first set of sequences is the nominal sequence and (ii) a second average loss involving incorrect classifications of the second class with respect to a second set of sequences from the collection of sequences in which each sequence within the second set of sequences is the adversarial sequence. The method includes updating parameters of the machine learning system based on the combined loss data.

According to at least one aspect, a non-transitory computer readable medium comprises computer readable data which, when executed by a processor, causes the processor to perform a method. The method includes obtaining a collection of sequences. The collection of sequences include at least a first sequence and a second sequence. The method includes classifying the first sequence as belonging to a first class indicative of a nominal sequence based on a first prediction that the first sequence includes an unperturbed version of sensor data. The method includes classifying the second sequence as belonging to a second class indicative of an adversarial sequence based on a second prediction that the second sequence includes a perturbed version of the sensor data. The method includes generating combined loss data based on (i) a first average loss involving incorrect classifications of the first class with respect to a first set of sequences from the collection of sequences in which each sequence within the first set of sequences is the nominal sequence and (ii) a second average loss involving incorrect classifications of the second class with respect to a second set of sequences from the collection of sequences in which each sequence within the second set of sequences is the adversarial sequence. The method includes updating parameters of the machine learning system based on the combined loss data.

According to at least one aspect, a computer-implemented method relates to defending against an adversarial attack. The method includes obtaining a sequence of inputs to a first machine learning system. The method includes generating an adversarial label to classify the sequence of inputs as being adversarial based on a statistical determination that the sequence of inputs is a perturbed version of q plurality of frames of sensor data. The method includes identifying a sequence of output data that is generated by the first machine learning system based on the sequence of inputs. The method includes filtering out the sequence of output data based on the adversarial label to prevent an actuator system from being controlled based on the sequence of output data.

These and other features, aspects, and advantages of the present invention are discussed in the following detailed description in accordance with the accompanying drawings throughout which like characters represent similar or like parts.

DETAILED DESCRIPTION

The embodiments described herein, which have been shown and described by way of example, and many of their advantages will be understood by the foregoing description, and it will be apparent that various changes can be made in the form, construction, and arrangement of the components without departing from the disclosed subject matter or without sacrificing one or more of its advantages. Indeed, the described forms of these embodiments are merely explanatory. These embodiments are susceptible to various modifications and alternative forms, and the following claims are intended to encompass and include such changes and not be limited to the particular forms disclosed, but rather to cover all modifications, equivalents, and alternatives falling with the spirit and scope of this disclosure.

Figure 1:
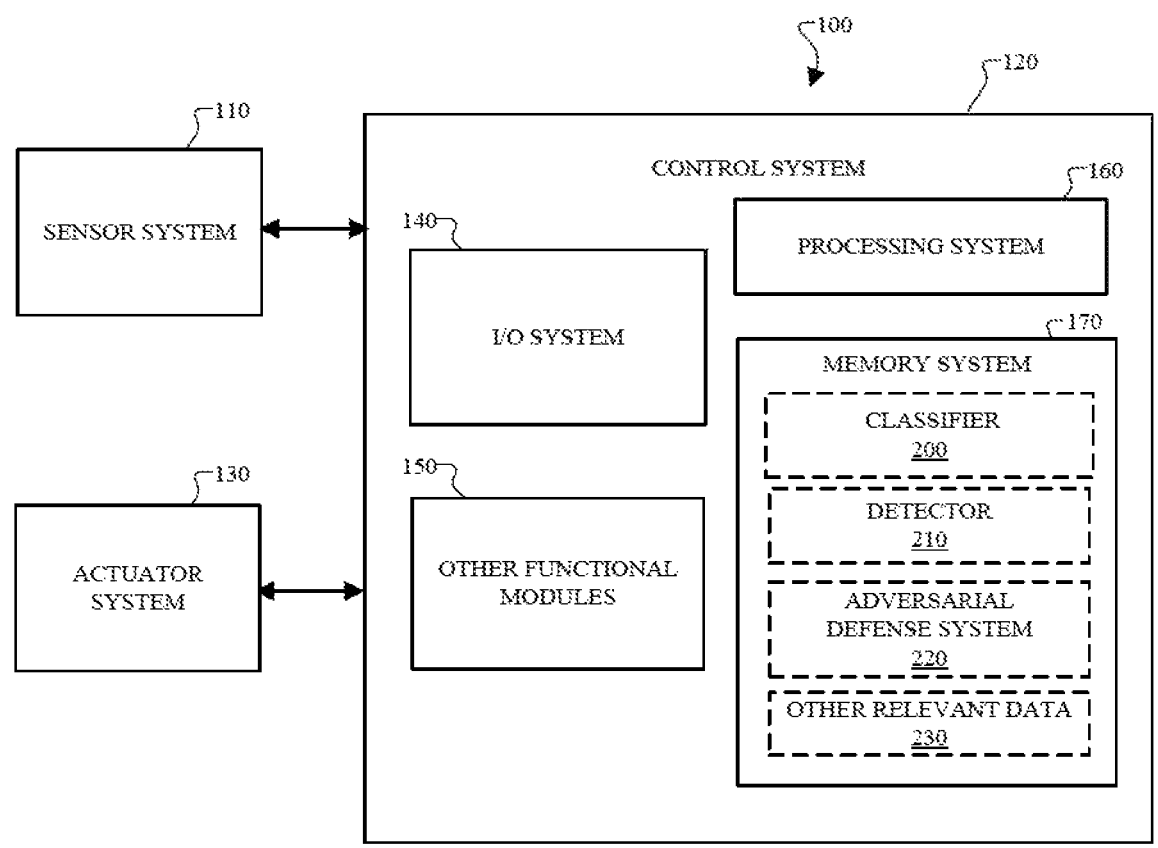
FIG. 1 is a diagram of an example of a system that includes a detector and an adversarial defense system according to an example embodiment of this disclosure.

FIG. 1 is a diagram of a system 100 that includes at a sensor system 110, a control system 120, and an actuator system 130. The system 100 is configured such that the control system 120 controls the actuator system 130 based on sensor data from the sensor system 110. More specifically, the sensor system 110 includes one or more sensors and/or corresponding devices to generate sensor data. For example, the sensor system 110 includes an image sensor, a camera, a radar sensor, a light detection and ranging (LIDAR) sensor, a thermal sensor, an ultrasonic sensor, an infrared sensor, a motion sensor, a satellite-based navigation sensor (e.g., Global Positioning System (GPS) sensor), a microphone, any suitable sensor, or any combination thereof. Upon obtaining detections of its environment, the sensor system 110 is operable to communicate with the control system 120 via an input/output (I/O) system 140 and/or other functional modules 150, which includes communication technology.

The control system 120 is configured to obtain the sensor data directly or indirectly from one or more sensors of the sensor system 110. In this regard, the sensor data may include sensor data from a single sensor or sensor-fusion data from a plurality of sensors. Upon receiving input, which includes at least sensor data, the control system 120 may implement a software mechanism, such as a sliding window, to obtain at least one sequence from a stream of sensor data. Each sequence may be any length and may include any number of elements. In an example, each sequence includes elements, where each element is a frame that includes at least sensor data. The control system is operable to process the sensor data via a processing system 160. In this regard, the processing system 160 includes at least one processor. For example, the processing system 160 includes an electronic processor, a central processing unit (CPU), a graphics processing unit (GPU), a microprocessor, a field-programmable gate array (FPGA), an application-specific integrated circuit (ASIC), processing circuits, any suitable processing technology, or any combination thereof. Upon processing at least this sensor data, the processing system 160 is operable to generate output data based on communications with memory system 170. In addition, the processing system 160 is operable to provide control data to the actuator system 130 based on the output data.

The memory system 170 is a computer or electronic storage system, which is configured to store and provide access to various data to enable at least the operations and functionality, as disclosed herein. The memory system 170 comprises a single device or a plurality of devices. The memory system 170 includes electrical, electronic, magnetic, optical, semiconductor, electromagnetic, any suitable memory technology, or any combination thereof. For instance, the memory system 170 may include random access memory (RAM), read only memory (ROM), flash memory, a disk drive, a memory card, an optical storage device, a magnetic storage device, a memory module, any suitable type of memory device, or any combination thereof. In an example embodiment, with respect to the control system 120 and/or processing system 150, the memory system 170 is local, remote, or a combination thereof (e.g., partly local and partly remote). For example, the memory system 170 is configurable to include at least a cloud-based storage system (e.g. cloud-based database system), which is remote from the processing system 160 and/or other components of the control system 120.

The memory system 170 includes at least a classifier 200. The classifier 200 includes a machine learning system 200A. The machine learning system 200A includes at least one artificial neural network (e.g., deep neural network) or any suitable machine learning technology. For convenience of reference, this machine learning system 200A is sometimes referred to as the "first machine learning system" in this disclosure. In response to input, the processing system 160, via the machine learning system 200A, is operable to generate output data based on the input. For example, upon receiving at least sensor data from the sensor system 110, the processing system 160, via application of the machine learning system 200A, is operable to predict a class for an entity of the sensor data and provide class data as output data. As a non-limiting example, for instance, the processing system 160, via the machine learning system 200A, is configured to assign a "pedestrian" class from among a plurality of classes (e.g., traffic sign, traffic light, animal, vehicle, etc.) upon determining that a detected entity of the sensor data most likely belongs to the pedestrian class. Upon generating this output data (e.g., class data indicating a pedestrian) via the machine learning system 200A, the processing system 160 is operable to generate control data for the actuator system 130 based at least on this output data (e.g., "pedestrian") such that the actuator system 130 is controlled to perform an action that takes into account the detections of the sensor system 110.

The memory system 170 also includes a detector 210. The detector 210 is advantageously configured to discriminate between nominal sequences and adversarial sequences. More specifically, the detector 210 includes at least one machine-learning system 210A. For convenience of reference, this machine learning system 210A is sometimes referred to as the "second machine learning system" to differentiate it from the machine learning system 200A, which may be referred to as the "first machine learning system." More specifically, the detector 210 includes at least one neural network and/or deep neural network architecture, which is tailored for temporal sequences. For example, the detector 210 includes at least a recursive neural network (RNN), a long short-term memory (LSTM) network, a gated recursive unit (GRU), other suitable machine learning technology, or any combination thereof.

The detector 210, via the processing system 160, is configured to obtain the same inputs that are directly received and processed by the classifier 200. More specifically, the machine learning system 210A of the detector 210, via the processing system 160, obtains a sequence of inputs at the same time or within a similar timeframe as the machine learning system 200 of the classifier 200. The detector 210 may be at least partly integral with the machine learning system 200A and/or at least partly separate from the machine learning system 200A. Upon receiving a sequence of inputs, the processing system 160, via the detector 210 is configured to generate a nominal label, indicative of a detection of a "nominal sequence," upon statistically determining that the sequence of inputs includes a sequence of nominal data and generate an adversarial label, indicative of a detection of "an adversarial sequence," upon statistically determining that the sequence of inputs includes a sequence of adversarial data or a sequence of non-nominal data. By evaluating sequences, the detector 210 is configured to determine an absence or presence of an adversarial attack to the machine learning system 200A as adversarial attacks often involve iterative attempts at perturbing inputs in order to cause the machine learning system 200A to fail.

The memory system 170 also includes an adversarial defense system 220. The adversarial defense system 220 includes at least software technology. Additionally or alternatively, the adversarial defense system 220 may include hardware technology. The adversarial defense system 220 is configured to be, at least partly, separate from or integral with the detector 210. The adversarial defense system 220, via the processing system 160, is configured to receive output data from the machine learning system 200A and corresponding classification data from the detector 210. More specifically, the adversarial defense system 220 receives the sequence of output data from the machine learning system 200A that are generated based on the same sequence of inputs that the classification data classifies. In this regard, the processing system 160 is configured to identify the sequence of output data from the machine learning system 200A that corresponds to the classification data for the sequence of inputs to the machine learning system 200A via at least timestamp data or any suitable correlation data.

The adversarial defense system 220, via the processing system 160, is advantageously configured to ensure that at least one other system (e.g., actuator system 130) is protected from directly or indirectly receiving a sequence of output data from the machine learning system 200A that has been generated based on a sequence of inputs that is deemed to be an adversarial sequence by the detector 210. More specifically, upon receiving an adversarial label from the detector 210, the adversarial defense system 220, via the processing system 160, is configured to take defensive action with respect to the identified sequence of output data from the machine learning system 200A that corresponds to the adversarial sequence. For example, the adversarial defense system 220 is configured to delay the output data, replace the output data with predetermined output data (e.g., default output data, an alert, etc.), reject the output data, filter out the output data, discard the output data, and/or take any suitable action that prevents the system 100 from acting on the sequence of output data that is generated based on the detected sequence of adversarial data. Accordingly, the adversarial defense system 220, when cooperating with the detector 210 and the processing system 160, is configured ensure that the system 100 operates with a predetermined level of accuracy by ensuring that the system 100 only acts upon a sequence of output data, which is generated based on a sequence of inputs that is deemed nominal.

Furthermore, as shown in FIG. 1, the system 100 includes other components that contribute to operation of the control system 120 in relation to the sensor system 110 and the actuator system 130. For example, as shown in FIG. 1, the memory system 170 is also configured to store other relevant data 230, which relates to the operation of the system 100 in relation to one or more components (e.g., sensor system 110, the actuator system 130, the machine learning system 200A, the detector 210, and the adversarial defense system 220). Also, as shown in FIG. 1, the control system 120 includes the I/O system 140, which includes one or more interfaces for one or more I/O devices that relate to the system 100. For example, the I/O system 140 provides at least one interface to the sensor system 110 and at least one interface to the actuator system 130. Also, the control system 120 is configured to provide other functional modules 150, such as any appropriate hardware, software, or any combination thereof that assist with and/or contribute to the functioning of the system 100. For example, the other functional modules 150 include an operating system and communication technology that enables components of the system 100 to communicate with each other as described herein. With at least the configuration discussed in the example of FIG. 1, the system 100 is applicable in various technologies.

Figure 2:
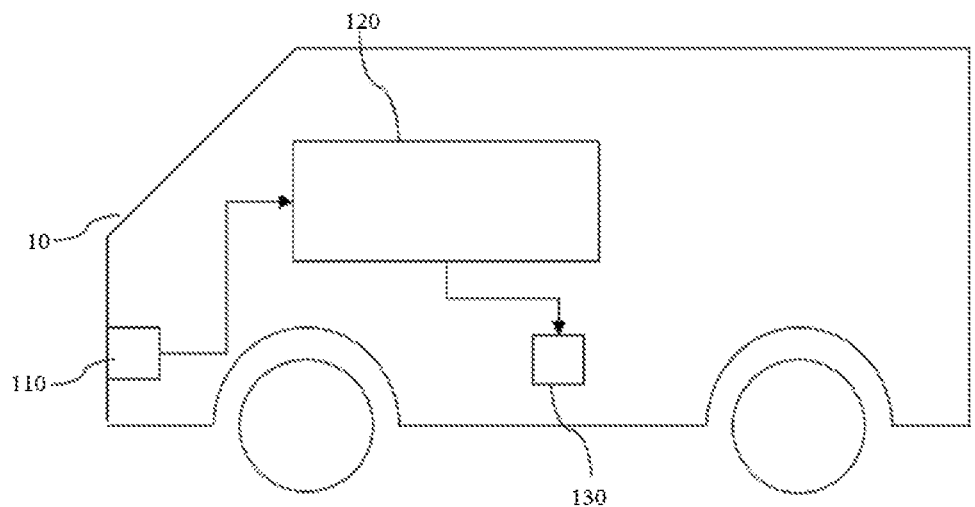
FIG. 2 is a diagram of an example of the system of FIG. 1 with respect to mobile machine technology according to an example embodiment of this disclosure.

FIG. 2 is a diagram of an example of the system 100 with respect to mobile machine technology according to an example embodiment. More specifically, in FIG. 2, the system 100 is employed by a vehicle 10 in which the control system 120 controls at least one actuator system 130 of the vehicle 10 in accordance with sensor data from the sensor system 110. Also, in FIG. 2, the control system 120 includes an obstacle detection system. In this example, the control system 120 is configured to detect an entity based on the sensor data and generate boundary data (e.g., outline, contour, or frame) that corresponds to the detection of the entity with respect to the sensor data. More specifically, upon receiving at least the sensor data and/or the boundary data of the entity that is detected from the sensor data, the processing system 160, via the classifier 200 with its machine learning system 200A, is configured to predict an identity of the entity and provide output data based on its prediction. As a non-limiting example, for instance, upon receiving sensor data and/or boundary data indicating at least one entity that is detected from among this sensor data, the processing system 160, via the machine learning system 200A, is configured to classify the detected entity as belonging to the pedestrian class from among several classes (e.g., traffic light, traffic sign, vehicle, animal, road structure, etc.) of obstacles. In addition, the processing system 160, via the machine learning system 200A, is configured to generate class data to indicate that the detected entity is a "pedestrian." Also, in this non-limiting example, upon the generation of this class data via the classifier 200, the control system 120 is configured to generate control data for the actuator system 170 to actuate at least one functional component of the vehicle 10 based on the class data that that identifies the detected entity that is being sensed in the environment of the vehicle 10. For example, the actuator system 130 may include a steering system such that the control system 120 generates control data that relates to a steering action. As another example, the actuator system 130 may include a braking system such that the control system 120 generates control data that relates to a braking action. The actuator system 130 is not limited to a steering system and/or a braking system, but may include any actuator relating to the vehicle 10.

In addition, the control system 120 is configured, via the detector 210, to generate classification data for each sequence of inputs to the machine learning system 200A. The classification data classifies the sequence of inputs as being (i) a nominal sequence comprising nominal elements or (ii) an adversarial sequence comprising adversarial elements. In this regard, the detector 210 is advantageous in identifying each nominal sequence that the machine learning system 200A receives as input and enabling the system 100 to operate based on each corresponding sequence of output data that is generated by the machine learning system 200A with a level of assurance that an adversarial attack was most likely absent during the generation of the corresponding sequence of output data. Also, the detector 210 is advantageous in identifying each adversarial sequence that the machine learning system 200A receives as input and enabling the system 100 to take defensive action with respect to a possible adversarial attack and avoid using the each corresponding sequence of output data that was generated from the machine learning system 200A during that time frame.

The control system 120 is also configured to provide this classification data from the detector 210 along with the corresponding output data from the machine learning system 200A to the adversarial defense system 220. In this regard, the adversarial defense system 220 is configured to handle the output data obtained from the machine learning system 200A according to the classification data obtained from the detector 210. For example, upon receiving a nominal label from the detector 210, the adversarial defense system 220 is configured to identify output data from the machine learning system 200A that is generated based on this sequence of inputs that correspond to the nominal label, and provide an indication that the control system 120 is to handle the output data in a nominal mode. In the nominal mode, the control system 120 is operable to generate control data based on the corresponding output data of the machine learning system 200A. Alternatively, upon receiving an adversarial label from the detector 210, the adversarial defense system 220 is configured to identify output data from the machine learning system 200A that is generated based on the flagged sequence of inputs that correspond to the adversarial label, and provide an indication that the control system 120 is to handle the output data in defensive mode. In the defensive mode, the adversarial defense system 220 is configured to delay the output data, replace the output data with predetermined output data (e.g., default output data), reject the output data, filter out the output data, discard the output data, or take any suitable action that prevents the system 100 from acting on the output data that is generated based on the detected sequence of adversarial data. Upon receiving communications from the adversarial defense system 220 that selectively includes only sequences of output data from the machine learning system 200A that corresponds to nominal sequences, the control system 120 is configured to generate control data that is based on these nominal sequences of output data. In response to the control data, the actuator system 130 is configured to control or assist with actuation of the vehicle 10, which may be autonomous, highly-autonomous, partially-autonomous, conditionally-autonomous, or driver-assisted.

Additionally or alternatively to the example of FIG. 2, the system 100 (and/or control system 120) is also operable in other applications. For example, the system 100 and/or control system 120 is operable in various fields, such as computer-controlled machines, robots, home-appliances, power tools, electronic personal assistants, healthcare/medical technology, mobile machines, security technology, etc. That is, the system 100 and/or control system 120 is not limited to the above-mentioned applications, but can be applied to any suitable application that benefits from detecting an adversarial attack that employs iterative techniques that involve perturbations over a sequence of elements.

Figure 3A:
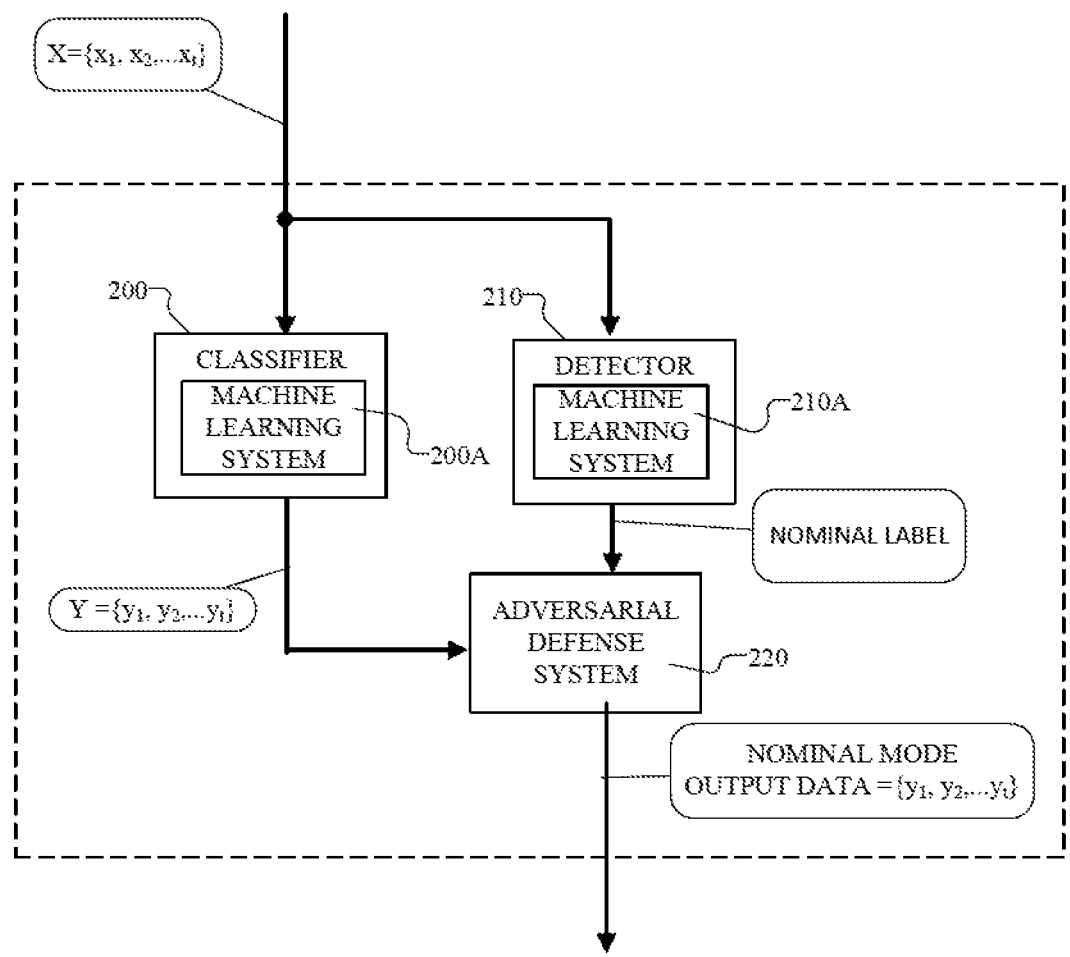
FIG. 3A is a conceptual diagram of some components of the system of FIG. 1 with respect to a nominal mode of operation according to an example embodiment of this disclosure.
Figure 3B:
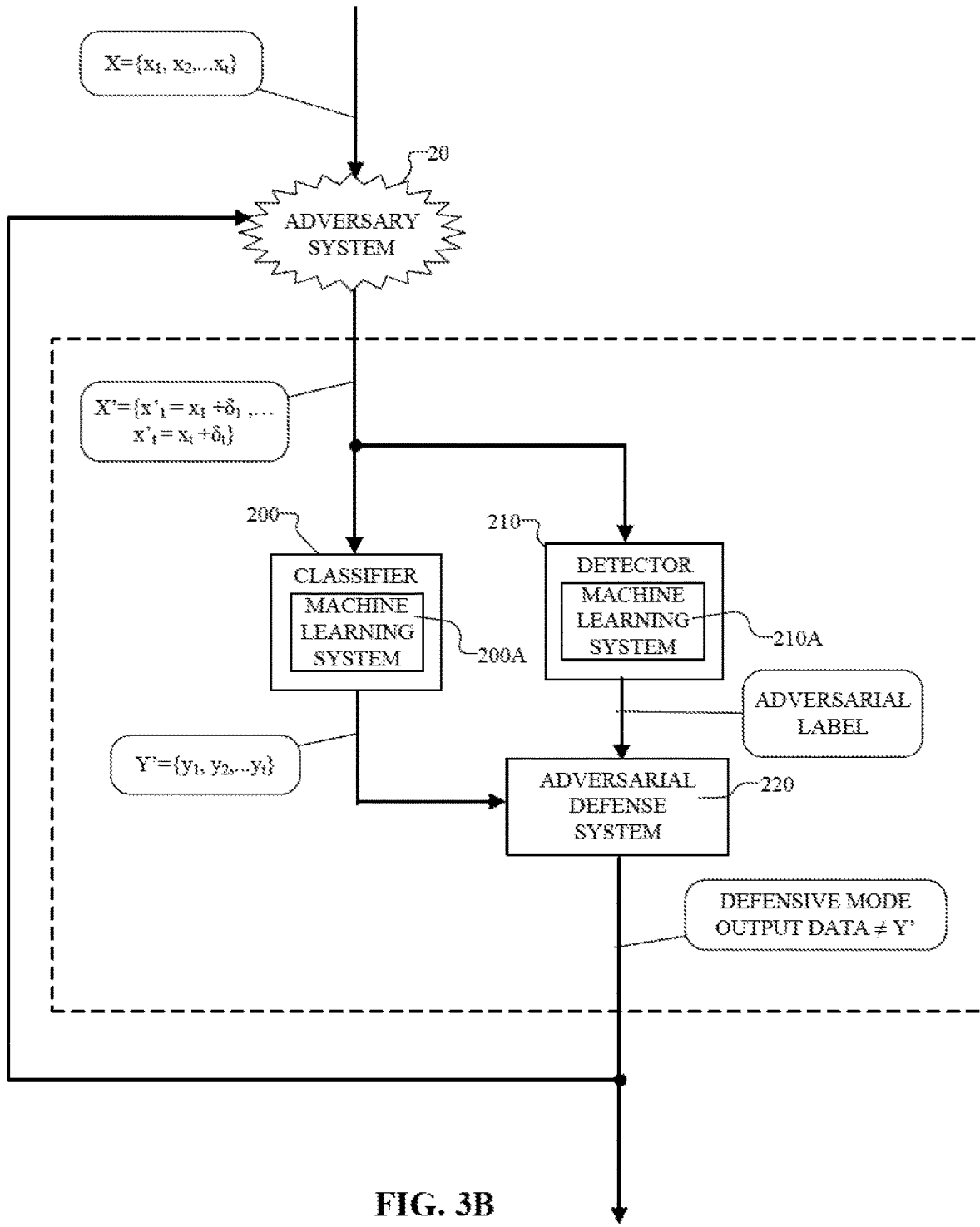
FIG. 3B is a conceptual diagram of some components of the system of FIG. 1 with respect to a defensive mode of operation according to an example embodiment of this disclosure.

FIGS. 3A and 3B illustrate conceptual diagrams of the interactions of some components of the system 100, particularly the machine learning system 200A, the detector 210, and the adversarial defense system 220. More specifically, in FIG. 3A, the control system 120 operates in the nominal mode when the detector 210 determines that a sequence of inputs is nominal and/or the adversarial defense system 220 indicates an absence of an adversarial attack. In contrast, in FIG. 3B, the control system 120 operates in the adversarial mode when the detector 210 determines that the sequence of inputs is adversarial and/or the adversarial defense system 220 indicates a presence of an adversarial attack. Furthermore, although not shown in FIGS. 3A and 3B, the processing system 150 is actively engaged with these components during both the nominal mode and the defensive mode.

FIG. 3A illustrates an example of a scenario in which the control system 120 operates in a nominal mode. More specifically, the sensor system 110 provides a stream of sensor data based on its environment. The stream of sensor data includes a sequence of sensor data, which may be represented as $X=\{x_1, x_2, \ldots x_t\}$, where X represents the sequence and $x_1$ to $x_t$ represent the elements of the sequence. For example, each element of the sequence X may refer to a frame of sensor data. Upon obtaining the sensor data, the processing system 150, via the machine learning system 200A, is configured to generate class data for the sensor data. The class data, which are output via the machine learning system 200A for the stream of sensor data, may be represented as $Y=\{y_1, y_2, \ldots y_t\}$, where Y represents the sequence and $y_1$ to $y_t$ represent the elements of the sequence. For example, each element of the sequence Y may refer to class data that is generated by the machine learning system 200A for each element of the sequence X.

The detector 210 is configured to receive the same input (e.g., $X=\{x_1, x_2, \ldots x_t\}$) as the machine learning system 200A. Upon receiving the sequence of sensor data as input, the detector 210 is configured to generate a nominal label upon predicting that the sequence of sensor data is a nominal sequence and generate an adversarial label upon predicting that the sequence of sensor data is an adversarial sequence. In this case, as shown in FIG. 3A, the detector 210 determines that the sequence of sensor data comprises nominal data and generates a nominal label for the input. The adversarial defense system 220 is configured to receive the nominal label from the detector 210 and the corresponding class data ($Y=\{y_1, y_2, \ldots y_t\}$) from the machine learning system 200A. In this case, since the detector 210 indicates that the machine learning system 200A received a nominal sequence as input, the adversarial defense system 220 is operable to indicate that the control system 120 is configured to operate in a nominal mode such that control data for the actuator system 170 is generated for the actuator system based at least on the class data from the machine learning system 200A.

FIG. 3B illustrates an example of a scenario in which the control system 120 operates in a defensive mode. Unlike FIG. 3A, FIG. 3B includes an adversary system 20, which is not a part of the system 100 and which is generating adversarial attacks to the system 100. In general, the adversary system 20 iteratively perturbs the sensor data to the machine learning system 200A to cause the machine learning system 200A to break down and/or fail. In this example, the adversary system 20 is operable to perturb the sensor data with perturbation data, which may be imperceptible, to an extent that the machine learning system 200A generates class data for the perturbed version of the sensor data that is different than the class data that would have been generated by the machine learning system 200A for an unperturbed version of that same sensor data. Often times, the adversary system 20 is unsuccessful in its first attempt to cause the machine learning system 200A to fail, and thus makes several attempts at perturbing inputs to the machine learning system 200A while using the output data (e.g., class data) of the machine learning system 200A as feedback to determine the perturbation data on the input that will cause the machine learning system 200A to fail. In this regard, the adversary system 20 typically relies on iterative techniques to achieve a successful adversarial attack.

As shown in FIG. 3B, the sensor system 110 generates a stream of sensor data based on its environment. The stream of sensor data includes a sequence of sensor data, which may be represented as $X=\{x_1, x_2, \ldots x_t\}$, where X represents the nominal sequence and where $x_1$ to $x_t$ represent the elements of the sequence. For example, each element may refer to a frame of sensor data. However, in this scenario, the adversary system 20 generates a sequence of perturbation data and perturbs the sensor data such that the machine learning system 200A receives a perturbed version of the sensor data. For example, the sequence of perturbation data may be represented by $\delta=\{\delta_1, \delta_2, \ldots \delta_t\}$, where S represents the sequence of perturbation data and where $\delta_1$ to $\delta_t$ represent the various perturbation elements of that sequence. Also, the perturbed version of the sensor data may be represented as $X'=(x'_1, x'_2, \ldots x'_t)$, where X' represents the perturbed version of the sequence X and where $x'_t$ to $x'_t$ represent the perturbed elements of the sequence that have been perturbed by the sequence of perturbation data $\delta=\{\delta_1, \delta_2, \ldots \delta_t\}$, respectively. Upon receiving the perturbed versions of the sensor data, the processing system 150, via the machine learning system 200A, is configured to generate class data that classifies these perturbed versions of the sensor data. In addition, the detector 210 is also configured to receive the same input (i.e., the perturbed sensor data of $X'=\{x'_1, x'_2, \ldots x'_t\}$) as the machine teaming system 200A. Upon receiving the perturbed version of the sequence of sensor data as input, the detector 210 is configured to generate a nominal label upon predicting that the sequence of sensor data is a nominal sequence and generate an adversarial label upon predicting that the sequence of sensor data is an adversarial sequence. In this case, as shown in FIG. 3B, the detector 210 determines that the sequence of inputs (i.e., X') to the machine learning system 200A is an adversarial sequence and generates an adversarial label for that sequence of inputs (i.e., X'). The adversarial defense system 220 is configured to receive the adversarial label from the detector 210 and the corresponding sequence, Y', of class data ($Y'=\{y_1, y_2, \ldots y_t\}$) from the machine learning system 200A based on timestamp data. In this case, since the detector 210 indicates that the sequence of inputs to the machine learning system 200A is an adversarial sequence, the adversarial defense system 220 is configured to activate the defensive mode such that the corresponding sequence of class data, which is generated based on the flagged inputs, are filtered out and prevented from affecting downstream systems, such as the actuator system 170. For example, in FIG. 3B, the adversarial defense system 220 does not permit use of the corresponding class data of $Y'=(y_1, y_2, \ldots y_t)$ as output data.

Figure 4:
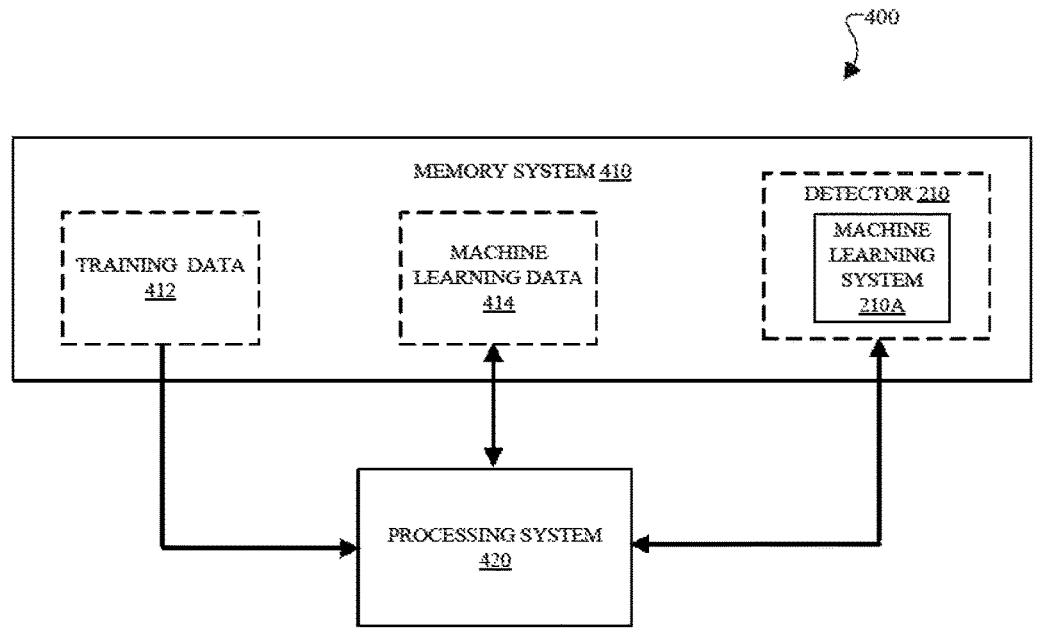
FIG. 4 is a diagram of an example of a system associated with training a detector according to an example embodiment of this disclosure.

FIG. 4 is a diagram of a system 400 associated with training the detector 210 according to an example embodiment. In this simplified example, the system 400 includes at least a memory system 410 and a processing system 420. In FIG. 4, the memory system 410 is a computer or electronic storage system, which is configured to store and provide access to various data to enable at least the operations and functionality, as disclosed herein. The memory system 410 comprises a single device or a plurality of devices. The memory system 410 includes electrical, electronic, magnetic, optical, semiconductor, electromagnetic, any suitable memory technology, or any combination thereof For instance, the memory system 410 includes RAM, ROM, flash memory, a disk drive, a memory card, an optical storage device, a magnetic storage device, a memory module, any suitable type of memory device, or any combination thereof. In an example embodiment, with respect to the processing system 420, the memory system 410 is local, remote, or a combination thereof (e.g., partly local and partly remote). For example, the memory system 410 is configured to include at least a cloud-based storage system (e.g. cloud-based database system), which is remote from the processing system 420.

In an example embodiment, as shown in FIG. 4, the memory system 410 includes the detector 210, which includes the machine-learning system 210A. Also, as shown in FIG. 4, the memory system 410 includes at least training data 412 and machine learning data 414, which are used to generate the detector 210. In addition, the memory system 410 is configured to include other relevant data, which relates to training and generating the detector 210 as discussed herein. More specifically, the training data 412 includes at least sensor data (and/or image data based on the sensor data). The machine learning data 414 includes machine learning algorithms associated a method 700 (FIG. 7) for training and generating the detector 210. The detector 210 includes the machine learning system 210A along with various data (e.g., various layers, weights, parameter data, etc.), which are associated with the training and/or operation of its machine learning system 210A. Once trained to perform at a predetermined level of accuracy, the detector 210 is deployable and/or employable by the system 100 of FIG. 1 or any suitable application system.

Upon receiving training data 412, the processing system 420 is configured to train the machine learning system 210A according to the machine learning data 414. In this regard, the processing system 420 includes at least one processor. For example, the processing system 420 includes an electronic processor, a CPU, a GPU, a microprocessor, a FPGA, an ASIC, processing circuits, any suitable processing technology, or any combination thereof. In an example embodiment, the processing system 420 communicates with the memory system 410 to generate the detector 210 based on the training data 412 and the machine learning data 414.

Figure 5:
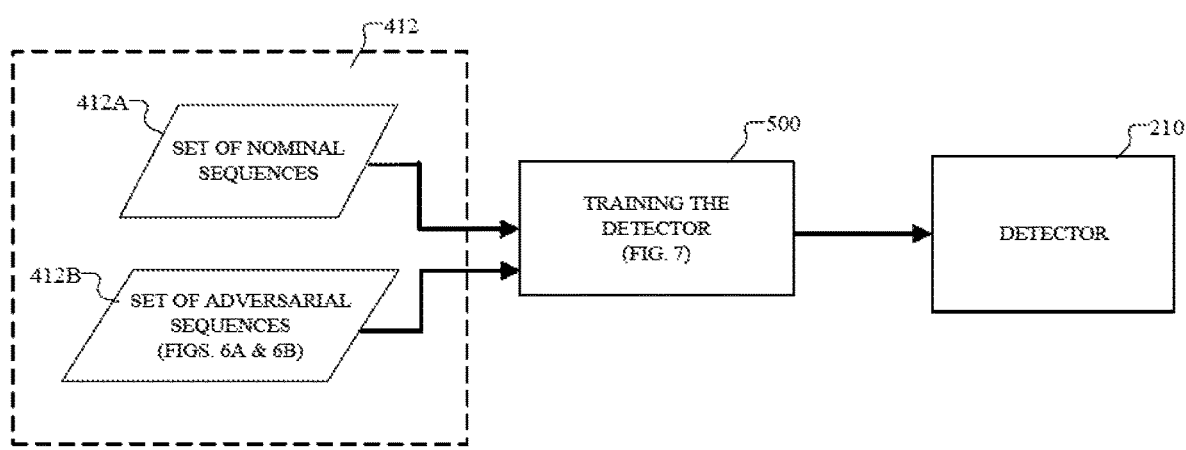
FIG. 5 is a flow diagram associated with training a detector according to an example embodiment of this disclosure.

FIG. 5 is a flow diagram associated with a training process 500 to generate the detector 210 according to an example embodiment. In general, the training process 500 involves a substantial and sufficient amount of training data 412 to ensure that the detector 210 performs accurately. For example, the collection of training data 412 includes at least a set of nominal sequences 412A and a set of adversarial sequences 412B. In addition, the training data 412 may include historical and/or actual adversarial attack data, which are collected from real-life adversarial attacks to various machine learning systems.

The set of nominal sequences 412A includes at least sensor data, sensor-fusion data, image data based on sensor data, image data based on sensor-fusion data, or any combination thereof. Also, in this example, the set of adversarial sequences 412B include at least one or more perturbed versions of the set of nominal sequences 412A. In general, the set of adversarial sequences 412B may include any sequence in which a plurality of elements thereof are perturbed by perturbations even if the sequence is not successful in causing a machine learning system to fail (e.g., misclassify the sequence such that $f(x') \neq f(x)$, where $f(x')$ represents output data of the machine learning system based on the perturbed version of the element and $f(x)$ represents output data of that machine learning system based on an unperturbed version of that same element). After completing this training process 500 with at least this collection of training data 412, the detector 210, via at least one processor, is configured to generate a nominal label upon predicting that a sequence is a nominal sequence (or unperturbed versions of sensor data) and generate an adversarial label upon predicting that the sequence is an adversarial sequence (or perturbed versions of that sensor data).

Figure 6A:
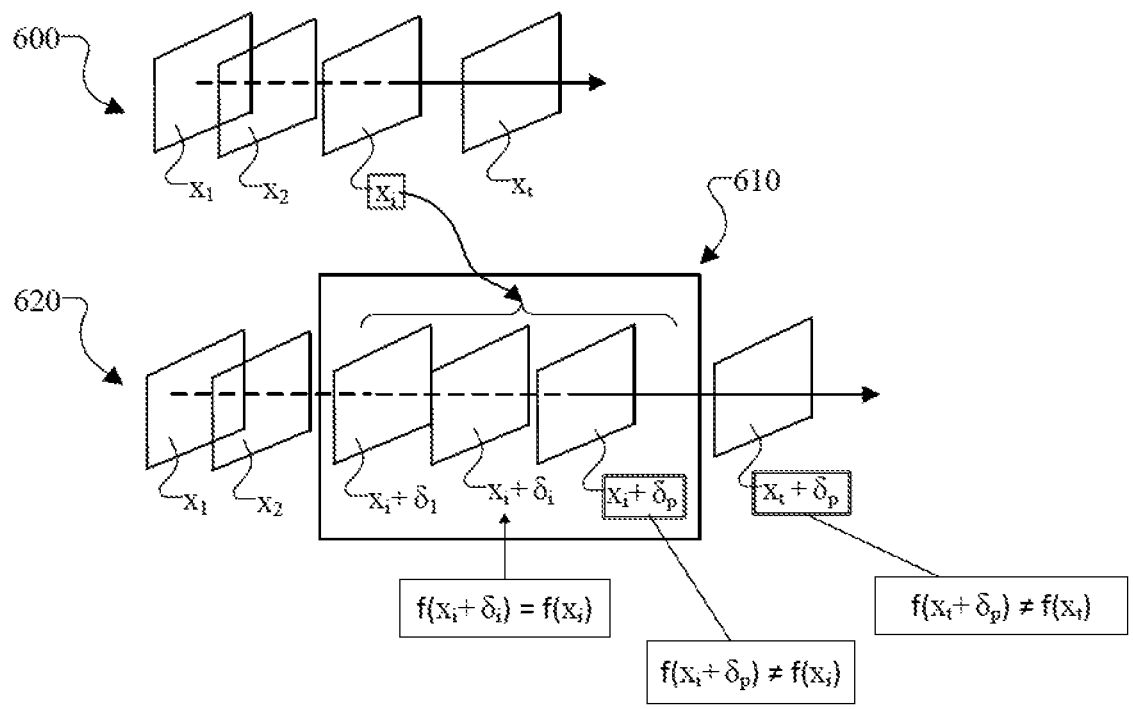
FIG. 6A is a conceptual diagram of examples of adversarial sequences that are generated based on a nominal sequence according to an example embodiment of this disclosure.
Figure 6B:
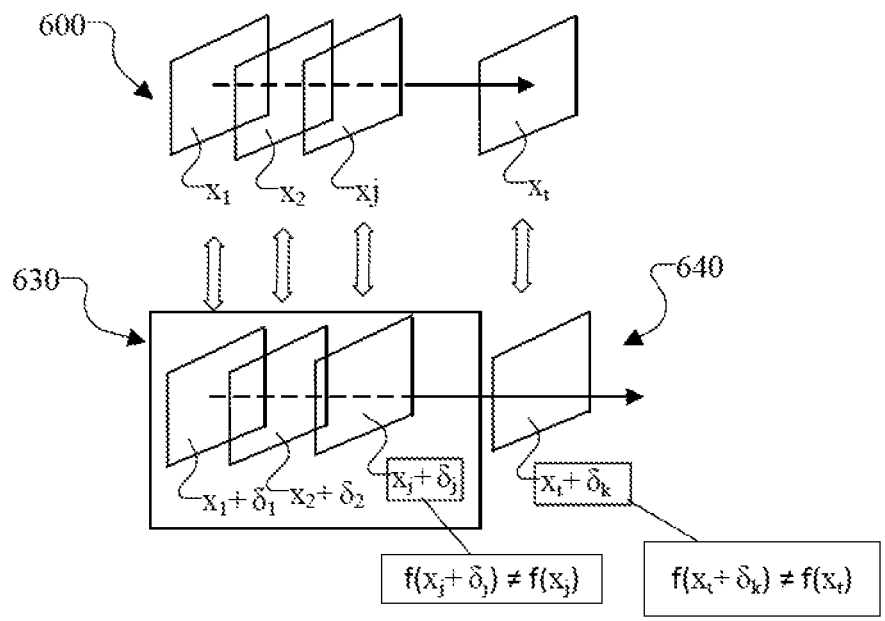
FIG. 6B is a conceptual diagram of other examples of adversarial sequences that are generated based on a nominal sequence according to an example embodiment of this disclosure.

FIGS. 6A and 6B illustrate examples of training data 412. For example, FIG. 6A illustrates a nominal sequence 600, which includes elements as denoted by $x_1$ to $x_t$. In this case, each element is a frame of sensor data. For instance, each element may be an image frame, as taken from a video stream. Also, as shown in FIG. 6A, the nominal sequence 600 is sequential with respect to time, which advances in the direction of the arrow. FIG. 6A also illustrates an adversarial sequence 610, which is generated from the nominal sequence 600. In this regard, for example, upon receiving the nominal sequence 600, the processing system 420 is configured to generate the adversarial sequence 610 by selecting an element (e.g., $x_i$) from the nominal sequence 600 and perturbing that element iteratively, whereby a plurality of perturbed versions (e.g., $x'_{i,1} = x_i + \delta_1, \ldots, x'_{i,p} = x_i + \delta_p$) are generated to form the adversarial sequence 610. In FIG. 6A, the selected element, $x_i$, is perturbed 'p' times, where p represents the iteration at which the selected element generates the perturbed element $x'_{i,p}$ (i.e., $x_i + \delta_p$), which causes the machine learning system 200A to fail such that $f(x_i + \delta_p) \neq f(x_i)$. In addition, FIG. 6A also illustrates that an adversarial sequence 620, which includes the adversarial sequence 610 as a subsequence, may be provided as training data 412.

FIG. 6B also illustrates an adversarial sequence 630, which is generated from the nominal sequence 600. More specifically, the processing system 420 is configured to generate the adversarial sequence 630 by perturbing each element of the nominal sequence. In this case, the adversarial sequence 630 includes a perturbed version of a respective element of the nominal sequence 600 until the machine learning system 200A fails. For example, the adversarial sequence 630 includes a perturbed version of the first element of the nominal sequence, a perturbed version of the second element of the nominal sequence, and so forth until the machine learning system 200A fails. In addition, FIG. 6B also illustrates an adversarial sequence 640, which includes the adversarial sequence 630 as a subsequence. In this case, the processing system 420 is configured to generate at least these adversarial sequences 630 and 640 by perturbing the elements of the nominal sequence 600 with respective elements from an adversary signature of perturbations (e.g., $\delta_1, \delta_2 \ldots, \delta_k$).

As discussed above, FIGS. 6A and 6B illustrate some examples of training data 412 that can be used to train the detector 210 during the training process 500. FIGS. 6A and 6B are advantageous in that the processing system 420 is enabled to generate these adversarial sequences 610, 620, 630 and 640 upon obtaining at least one nominal sequence 600. In addition, the processing system 420 is also configured to generate other adversarial sequences 610, 620, 630, and 640 from the nominal sequence 600 by attacking the nominal sequence 600 with other adversary signatures involving other perturbations. However, the set of adversarial sequences 412B is not limited to the above-mentioned adversarial sequences 610, 620, 630, and 640 (and/or adversarial sequences that cause the machine learning system 200A to fail), but can include any adversarial sequence that includes a sequence of perturbed elements. In general, the detector 210 benefits by being trained with as much training data 412 as possible to an extent that its ability to discriminate between a nominal sequence and an adversarial sequence is enhanced.

Figure 7:
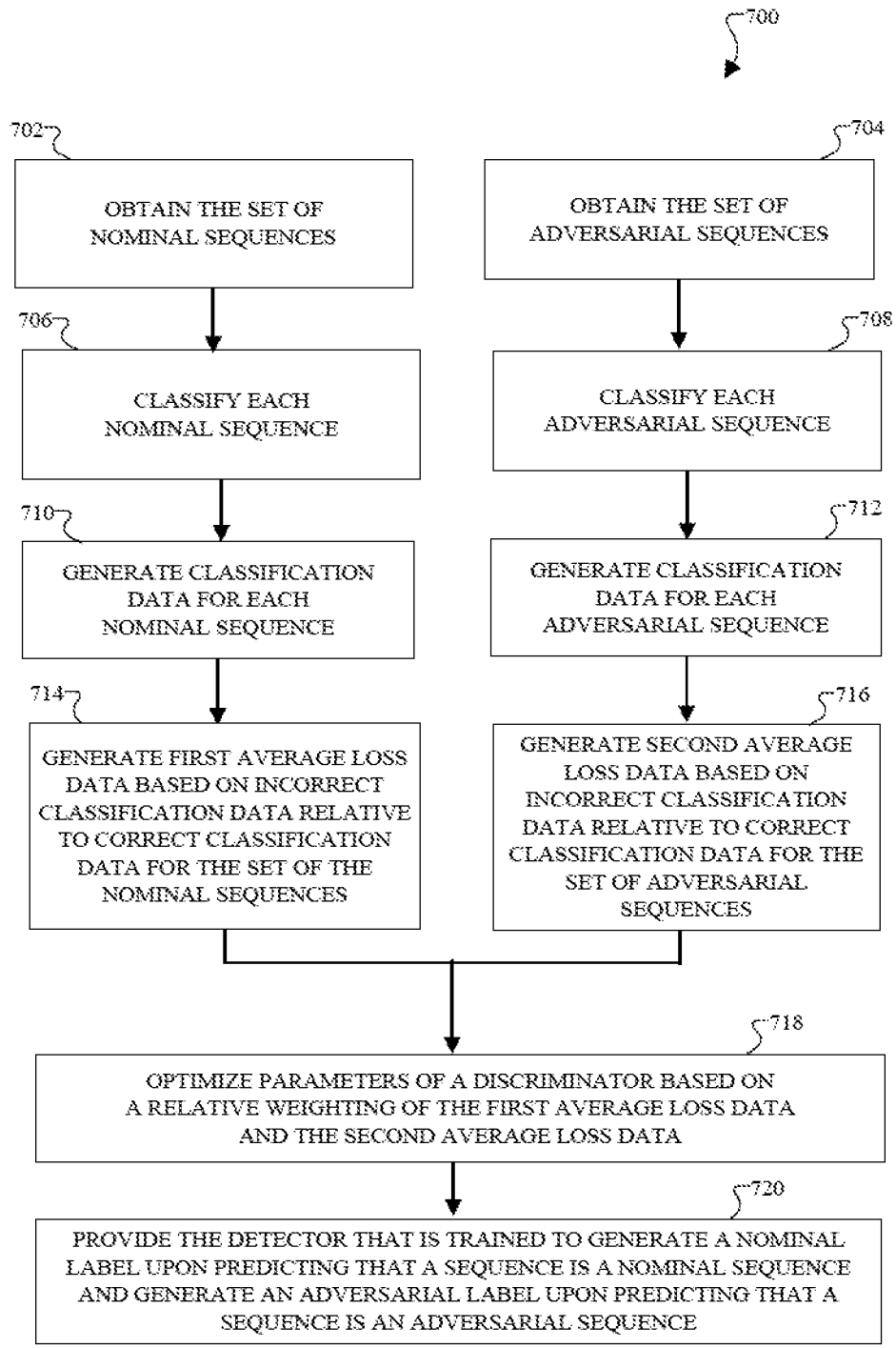
FIG. 7 is a flow diagram of an example of a training process for generating the detector according to an example embodiment of this disclosure.

FIG. 7 illustrates a flow diagram of an example of the training process 500 (FIG. 5) for generating the detector 210 according to an example embodiment. This training process 500 includes a method 700 for training at least one machine learning system 210A of the detector 210 to differentiate between at least one sequence of nominal data and at least one sequence of adversarial data. Advantageously, this method 700 provides training data 412 that includes both a set of nominal sequences 412A and a set of adversarial sequences 412B while also optimizing parameters of the machine learning system 210A of the detector 210 based on results obtained from this training data 412. Accordingly, upon undergoing the training process 500 with this method 700, the detector 210 becomes operable to identify a sequence, predict whether or not the sequence is nominal/adversarial, and provide a label indicative of its prediction.

At step 702, the processing system 420, via the detector 210, obtains a first set of training data. For example, the first set of training data includes a sufficient amount of nominal data to train the detector 210 such that the machine learning system 210A is configured to operate with a predetermined level of accuracy. More specifically, the first set of training data includes a set of nominal sequences 412A in which each sequence includes nominal data that is unperturbed by perturbation data. As discussed above, for instance, the nominal data includes sensor data, sensor-fusion data, image data based on sensor data, image data based on sensor-fusion data, or any combination thereof. Upon obtaining a set of nominal sequences 412A as training data 412, the method 700 proceeds to step 706.

At step 704, the processing system 420, via the detector 210, obtains a second set of training data. For example, the second set of training data includes a sufficient amount of adversarial data to train the detector 210 such that the machine learning system 210A is configured to operate with a predetermined level of accuracy. More specifically, the second set of training data includes a set of adversarial sequences 412B in which each sequence includes nominal data that is perturbed by perturbation data. In this regard, for instance, each adversarial sequence includes a plurality of perturbed sensor data, perturbed sensor-fusion data, perturbed image data based on sensor data, perturbed image data based on sensor-fusion data, or any combination thereof. In general, the adversarial sequences correspond to the nominal sequences, but further include perturbations on the elements. Upon obtaining a set of adversarial sequences 412B as training data 412, the method 700 proceeds to step 708.

At step 706, the processing system 420, via the detector 210, classifies each sequence from the set of nominal sequences, which may be referred to as the first set of training data. The processing system 420, via the detector, is operable to analyze a sequence and assign one of the classes to that sequence. For example, the processing system 420, via the detector 210, is configured to evaluate a sequence from the set of nominal sequences and determine by its machine learning model that the sequence belongs to the nominal class or the adversarial class.

At step 708, the processing system 420, via the detector 210, classifies each sequence from the set of adversarial sequences, which may be referred to as the second set of training data. The processing system 420, via the detector, is operable to analyze a sequence and assign one of the classes to that sequence. For example, the processing system 420, via the detector 210, is configured to evaluate a sequence from the set of adversarial sequences and determine by its machine learning model that the sequence belongs to the nominal class or the adversarial class.

At step 710, the processing system 420, via the detector 210, generates classification data based on the first set of training data. In this case, the first set of training data includes the set of nominal sequences 412A. The detector 210 is operable to generate a nominal label for an input upon predicting that the input is a sequence of nominal data (or a sequence of non-adversarial data) and generate an adversarial label for that input upon predicting that the input is a sequence of adversarial data (or a sequence of non-nominal data). In this regard, for instance, the nominal label may be represented by one binary symbol (e.g., zero) and the adversarial label may be represented by another binary symbol (e.g., one), or vice versa. In this case, since each input to the detector 210 is a nominal sequence from the first set of training data, the processing system 420 is enabled to compare the true classification data of a nominal label for a sequence of the first set with the predicted classification data (e.g. nominal label or adversarial label) for that sequence of the first set.

At step 712, the processing system 420, via the detector 210, generates classification data based on the second set of training data. In this case, the second set of training data includes the set of adversarial sequences 412B. As aforementioned, the detector 210 is operable to generate a nominal label for an input upon predicting that the input is a sequence of nominal data (or a sequence of non-adversarial data) and generate an adversarial label for that input upon predicting that the input is a sequence of adversarial data (or a sequence of non-nominal data). In this regard, consistent with step 710, the nominal label may be represented by one binary symbol (e.g., zero) and the adversarial label may be represented by another binary symbol (e.g., one). In this case, since each input to the detector 210 is an adversarial sequence from the second set of training data, the processing system 420 is enabled to compare the true classification data of an adversarial label for a sequence of the second set with the predicted classification data (e.g. nominal label or adversarial label) for that sequence of the second set.

At step 714, the processing system 420 generates average loss data of the detector 210 that relates to a difference between the predicted classifications and the true classifications of the first set of training data. More specifically, the processing system 420 evaluates incorrect classification data relative to correct classification data that is generated for the first set of training data (e.g., set of nominal sequences 412A). More specifically, with respect to this first set of training data, the detector 210 generates (i) correct classification data when a nominal label is predicted via machine learning system 210A upon receiving one of these nominal sequences as input and (ii) incorrect classification data when an adversarial label is predicted via machine learning system 210A upon receiving one of these nominal sequences as input. For mere convenience, this average loss data may be referred to as the "first average loss data."

At step 716, the processing system 420 generates average loss data of the detector 210 that relates to a difference between the predicted classifications and the true classifications of the second set of training data. More specifically, the processing system 420 evaluates incorrect classification data relative to correct classification data that is generated for the second set of training data (e.g., set of adversarial sequences 412B). More specifically, with respect to this second set of training data, the detector 210 generates (i) correct classification data when an adversarial label is predicted via machine learning system 210A upon receiving one of the adversarial sequences as input and (ii) incorrect classification data when a nominal label is predicted via machine learning system 210A upon receiving one of the adversarial sequences as input. For mere convenience, this average loss data may be referred to as the "second average loss data."

At step 718, the processing system 420 optimizes parameters of a discriminator of the detector 210 based on a relative weighted function involving the first average loss data and the second average loss data. More specifically, for example, the processing system 420 optimizes the parameters (e.g., $\theta$), associated with a discriminator (e.g., discriminative model or network) of the machine learning system 210A, which is parametrized by $\theta$ and which is represented by $d_\theta$ in the following equation:

$$d_\theta = \operatorname*{argmin}_{\theta} \left( \frac{\sum_{X \in \mathcal{X}} L(d(X), 0)}{|\mathcal{X}|} + \lambda \frac{\sum_{X' \in \mathcal{X}'} L(d(X'), 1)}{|\mathcal{X}'|} \right) \quad (1)$$

In this equation, the processing system 420 determines the values of the parameters (e.g., $\theta$) of the discriminator of the detector 210 for which the combined loss, $$\left( \frac{\sum_{X \in \mathcal{X}} L(d(X), 0)}{|\mathcal{X}|} + \lambda \frac{\sum_{X' \in \mathcal{X}'} L(d(X'), 1)}{|\mathcal{X}'|} \right),$$

attains its minimum via the argmin function. In this case, the combined loss includes the first average loss data $$\left( \frac{\sum_{X \in \mathcal{X}} L(d(X), 0)}{|\mathcal{X}|} \right)$$

and the second average loss data $$\left( \frac{\sum_{X' \in \mathcal{X}'} L(d(X'), 1)}{|\mathcal{X}'|} \right).$$

Also, in this equation, the loss function is represented by $L(y_p, y_c)$, which minimizes the error between output data $y_p$, and output data $y_c$, where output data $y_p$ represents the predicted classification data (e.g., nominal/adversarial label) of the input sequence and where output data $y_c$ represents the true classification data (e.g., nominal/adversarial label) of the input sequence.

Also, as indicated by equation (1), the processing system 420, via the detector 210, includes at least one machine learning model that performs binary sequence classification to identify whether or not an adversarial signature is present with respect to a sequence of input data. For instance, using $X^{test}$ as a test sequence of input for convenience of explanation, the detector 210 is configured to assign one binary value (e.g., the value of zero) to the test sequence as a nominal label upon determining that $d(X^{test})=0$ based on a prediction that the test sequence is a nominal sequence. In addition, the detector 210 is configured to assign the other binary value (e.g., the value of one) to the test sequence as an adversarial label upon determining that $d(X^{test})=1$ based on a prediction that the test sequence is an adversarial sequence. Alternatively, the detector 210 may be configured to assign any set of values (e.g., zero and one) as classification data (e.g., nominal label and adversarial label) provided that the detector 210 operates as described herein.

In equation (1), $\lambda$ represents a parameter that provides a relative weighting between the first average loss and the second average loss. The parameter, $\lambda$, enables the processing system 420 to adjust a balance of the relative weight of the misclassifications of the nominal data (e.g. nominal sequences) and the misclassifications of adversarial data (e.g., adversarial sequences) in accordance with the application. In this regard, the parameter, $\lambda$, provides a balancing factor between detections of nominal sequences (e.g., nominal sensor data) and detection of adversarial sequences (and/or adversarial attacks).

At step 720, the processing system 420 provides the detector 210, which is ready for deployment/employment, upon completing its training with optimized parameters. In this regard, after the parameters have been optimized and/or the detector 210 has been trained with the optimized parameters, the detector 210 is configured to be deployed/employed by the system 100 or any suitable system upon evaluating that the detector 210 operates with a predetermined level of accuracy. Also, once trained, the detector 210 with its machine learning system 210A, is advantageously enabled, via at least one processor, to predict by statistical determination and/or probabilistic means whether a sequence warrants a nominal label or an adversarial label, thereby providing an indication of the absence or presence of an adversarial attack.

Furthermore, various modifications can be made to the above-mentioned embodiments without departing from the spirit and scope of these embodiments. For example, in FIG. 1, instead of the classifier 200 and the machine learning system 200A associated therewith, the system 100 may include any software module with a trained machine learning system that is suitable for the intended application. That is, the detector 210 and adversarial defense system 220 are configured to provide the same or substantially similar advantages to any machine learning system and/or software system that relies on sequences of inputs that may be susceptible to adversarial attacks.

In addition, as another example of a modification, additionally or alternatively to synthetic types of attacks, the set of adversarial sequences 412B may include real-life adversarial attack data, which are acquired from actual adversarial attacks to various machine learning systems. Also, as yet another example of a modification, the set of adversarial sequences 412B is not limited to the examples of FIGS. 6A and 6B, but may include any perturbed version of a nominal sequence in which a plurality of perturbations occur over a plurality of elements (or frames) of that sequence. Additionally, as yet another example of a modification, the process of generating adversarial sequences is combinable with the training process 500 such that new adversarial sequences can be generated as a training set for each iteration of training the detector 210. Furthermore, the training process 500 can be performed in a plurality of iterations and a plurality of batches. Also, as yet another example of a modification, during the training process 500, the detector 210 and the adversary system 20 may be configured to create a zero-sum game, where the detector 210 is operable to minimize the combined loss while the adversary system 20 is operable to maximize the combined loss (e.g., making a sequence of adversarial data undetectable), thereby training the detector 210 to become more robust by addressing a more robust adversary system 20.

As described herein, the embodiments include a number of advantageous features and benefits. For example, the embodiments are advantageous in determining whether a sequence of inputs to the machine learning system 200A is a sequence of queries, which has an adversarial goal in the sense of understanding model limitations and/or learning perturbations to the input data that cause the machine learning system 200A to fail. In this regard, the embodiments are advantageous in addressing the technical problem of determining whether a sequence that is input to at least one machine learning system 200A is associated with nominal data (e.g., a sensor stream from a sensor) or adversarial data (e.g., a perturbed version of the sensor stream with adversarial queries from an adversary system 20) as a means of detecting an absence/presence of an adversarial attack. Upon detecting an adversarial sequence, the detector 210 is operable to flag its adversarial detections so that the system 100 is enabled to respond to the adversarial attack. As one example, for instance, the adversarial defense system 220 is activated to filter out a corresponding sequence of output data that is generated by the machine learning system 200A based on the adversarial sequence so that effects resulting from the adversarial sequence are avoided and/or not realized by another system that would otherwise receive this output data from the machine learning system 200A. For instance, the system 100 is operable to prevent incorrect output data (e.g., incorrect class data), which is based on a detected sequence of adversarial data, from affecting the actuator system 170, thereby providing an added level of security and safety to the system 100 with respect to adversarial attacks.

That is, the above description is intended to be illustrative, and not restrictive, and provided in the context of a particular application and its requirements. Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the general principles defined herein may be applied to other embodiments and applications without departing from the spirit and scope of the described embodiments, and the true scope of the embodiments and/or methods of the present invention are not limited to the embodiments shown and described, since various modifications will become apparent to the skilled practitioner upon a study of the drawings, specification, and following claims. For example, components and functionality may be separated or combined differently than in the manner of the various described embodiments, and may be described using different terminology. These and other variations, modifications, additions, and improvements may fall within the scope of the disclosure as defined in the claims that follow.

What is claimed is:

1. A computer-implemented method for training a machine learning system to detect an adversarial attack, the method comprising:
   obtaining a collection of sequences, the collection of sequences including at least a first sequence and a second sequence;
   classifying the first sequence as belonging to a first class indicative of a nominal sequence based on a first prediction that the first sequence includes an unperturbed version of sensor data;
   classifying the second sequence as belonging to a second class indicative of an adversarial sequence based on a second prediction that the second sequence includes a perturbed version of the sensor data;
   generating combined loss data based on (i) a first average loss involving incorrect classifications of the first class with respect to a first set of sequences from the collection of sequences in which each sequence within the first set of sequences is the nominal sequence and (ii) a second average loss involving incorrect classifications of the second class with respect to a second set of sequences from the collection of sequences in which each sequence within the second set of sequences is the adversarial sequence; and
   updating parameters of the machine learning system based on the combined loss data, wherein the updating parameters includes determining the parameters of a discriminative model of the machine learning system that minimize the combined loss data of a weighted function involving the first average loss and the second average loss.

2. The computer-implemented method of claim 1, wherein the machine learning system comprises a deep neural network with an architecture that processes temporal sequences.

3. The computer-implemented method of claim 1, wherein the machine learning system includes a recursive neural network, a long short-term memory network, or a gated recursive unit.

4. The computer-implemented method of claim 1, wherein:
   the first sequence is generated such that another machine learning system generates first class data for the first sequence;
   the second sequence is a perturbed version of the first sequence such that the another machine learning system generates second class data for the second sequence; and
   the first class data is different from the second class data.

5. The computer-implemented method of claim 4, wherein:
   the first sequence is extracted from a stream of sensor data;
   the first sequence includes a plurality of frames of sensor data; and
   the second sequence includes a subsequence, the subsequence includes iterative perturbed versions of a selected frame of the first sequence in which one of the perturbed versions of the selected frame causes the another machine learning system to generate the second class data for the second sequence.

6. The computer-implemented method of claim 4, wherein:
   the first sequence is extracted from a stream of sensor data;
   the first sequence includes a plurality of frames of sensor data; and
   each frame of the second sequence is perturbed by a respective perturbation such that the second sequence causes the another machine learning system to generate the second class data for the second sequence.

7. A non-transitory computer readable medium comprising computer readable data which, when executed by a processor, causes the processor to perform a method to train a machine learning system to detect an adversarial attack, the method comprising:
   obtaining a collection of sequences, the collection of sequences including at least a first sequence and a second sequence;
   classifying the first sequence as belonging to a first class indicative of a nominal sequence based on a first prediction that the first sequence includes an unperturbed version of sensor data;
   classifying the second sequence as belonging to a second class indicative of fill adversarial sequence based on a second prediction that the second sequence includes a perturbed version of the sensor data;
   generating combined loss data based, on (i) a first average loss involving incorrected classifications of the first class with respect to a first set of sequences from the collection of sequences in which each sequence within the first set of sequences is the nominal sequence and (ii) a second average loss involving incorrect classifications of the second class with respect to a second set of sequences from the collection of sequences in which each sequence within the second set of sequences is the adversarial sequence; and
   updating parameters of the machine learning system based on the combined loss data, wherein the updating parameters includes determining the parameters of a discriminator model of the machine learning system that minimize the combined loss data of a weighted function involving the first average loss and the second average loss.

8. The non-transitory computer readable medium of claim 7, wherein the machine learning system comprises a deep neural network with an architecture that processes temporal sequences.

9. The non-transitory computer readable medium of claim 7, wherein the machine learning system includes a recursive neural network, a long short-term memory network, or a gated recursive unit.

10. The non-transitory computer readable medium of claim 7, wherein:
    the first sequence is generated such that another machine learning system generates first class data for the first sequence;
    the second sequence is a perturbed version of the first sequence such that the another machine learning system generates second class data for the second sequence; and
    the first class data is different than the second data.

11. The non-transitory computer readable medium of claim 10, wherein:

the first sequence is extracted from a stream of sensor data;

the first sequence includes a plurality of frames of sensor data; and the second sequence includes a subsequence, the subsequence includes iterative perturbed versions of a selected frame of the first sequence in which one of the perturbed versions of the selected frame causes the another machine learning system to generate the second data for the second sequence.

12. The non-transitory computer readable medium of claim 10, wherein:

the first sequence is extracted from a stream of sensor data;

the first sequence includes a plurality of fames of sensor data; and each fame of the second sequence is perturbed by a respective perturbation such that the second sequence causes the another machine learning system to generate the second class data for the second sequence.

13. A computer-implemented method for defending against an adversarial attack, the computer-implemented comprising:

obtaining a sequence of inputs to a first machine learning system;

generating an adversarial label to classify the sequence of inputs based on a prediction that the sequence of inputs is a perturbed version of a plurality of frames of sensor data;

identifying a sequence of output data that is generated by the first machine learning system based on the sequence of inputs; and filtering out the sequence of output data from the first machine learning system based on the adversarial label to prevent an actuator system from being controlled by control data that is based on the sequence of output data, wherein:

the generating the adversarial label is performed by a second machine learning system;

the second machine learning system is trained with a set of sequences;

the set of sequences includes a set of nominal sequences and a set of adversarial sequences; and the set of adversarial sequences include perturbed versions of the set of nominal sequences such that the first machine learning system generates different class data based on the adversarial sequences compared to the class data based on the nominal sequences.

14. The computer-implemented method of claim 13, further comprising:

obtaining another sequence of inputs to the first machine learning system, the another sequence of inputs including another plurality of frames of sensor data;

generating a non-adversarial label for the another sequence of inputs based on another prediction that the another sequence of inputs are unperturbed by perturbation data;

obtaining another sequence of output data that is generated by the first machine learning system based on the another sequence of inputs; and controlling the actuator system based on the another sequence of output data.

15. The computer-implemented method of claim 11, further comprising:

operating a sliding window to obtain the sequence of inputs that are being input into the first machine learning system, wherein the plurality of frames of sensor data include iterative perturbed versions of a selected frame of sensor data.

16. The computer-implemented method of claim 13, wherein the second machine learning system includes a recursive neural network, a long short-term memory network, or a gated recursive unit.

* * * * *

UNITED STATES PATENT AND TRADEMARK OFFICE
CERTIFICATE OF CORRECTION

| | |
|---|---|
| PATENT NO. | : 11,657,153 B2 |
| APPLICATION NO. | : 16/715643 |
| DATED | : May 23, 2023 |
| INVENTOR(S) | : Condessa |

It is certified that error appears in the above-identified patent and that said Letters Patent is hereby corrected as shown below:

In the Claims

In Claim 12, at Column 19, Line 15: "plurality of fames" should read --plurality of frames--.

In Claim 12, at Column 19, Line 17: "each fame" should read --each frame--.

Signed and Sealed this
Twenty-ninth Day of August, 2023

Katherine Kelly Vidal
*Director of the United States Patent and Trademark Office*